(12) United States Patent
Mireault et al.

(10) Patent No.: US 11,831,969 B1
(45) Date of Patent: Nov. 28, 2023

(54) ASYMMETRIC COMPONENT ARRANGEMENT WITHIN SMALL FORM FACTOR CAMERAS

(71) Applicant: Apple Inc., Cupertino, CA (US)

(72) Inventors: Alfred N. Mireault, San Francisco, CA (US); Andrew S. Jozefov, Palo Alto, CA (US); Zachary W. Birnbaum, Saratoga, CA (US); Scott W. Miller, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/586,631

(22) Filed: Jan. 27, 2022

Related U.S. Application Data

(60) Provisional application No. 63/143,722, filed on Jan. 29, 2021.

(51) Int. Cl.
| | |
|---|---|
| *H04N 23/54* | (2023.01) |
| *G03B 13/36* | (2021.01) |
| *H04N 23/55* | (2023.01) |
| *H02K 41/035* | (2006.01) |

(52) U.S. Cl.
CPC ............ *H04N 23/54* (2023.01); *G03B 13/36* (2013.01); *H02K 41/0354* (2013.01); *H04N 23/55* (2023.01)

(58) Field of Classification Search
CPC ........ H04N 23/54; H04N 23/55; G03B 13/36; H02K 41/0354
See application file for complete search history.

(56) References Cited

U.S. PATENT DOCUMENTS

| | | | |
|---|---|---|---|
| 9,641,731 B2 * | 5/2017 | Goldenberg | ........... H04N 23/54 |
| 10,827,105 B1 | 11/2020 | Li et al. | |
| 2004/0247311 A1 | 12/2004 | Ajiki et al. | |
| 2018/0113374 A1 * | 4/2018 | Du | ........ G02B 27/646 |
| 2018/0173081 A1 * | 6/2018 | Kim | ........ H04N 23/67 |
| 2019/0204532 A1 * | 7/2019 | Konuma | ............ G02B 7/02 |
| 2020/0225442 A1 * | 7/2020 | Weng | ............ G03B 17/02 |

FOREIGN PATENT DOCUMENTS

| | | | |
|---|---|---|---|
| CN | 114500776 A | * | 5/2022 |
| KR | 10-1510384 | | 4/2015 |

\* cited by examiner

*Primary Examiner* — Shahbaz Nazrul
(74) *Attorney, Agent, or Firm* — Robert C. Kowert; Kowert, Hood, Munyon, Rankin & Goetzel, P.C.

(57) ABSTRACT

Small form factor cameras that may include one or more voice coil motor actuators, one or more springs and/or one or more motion damping mechanisms. Multiple cameras or camera modules may be positioned close together within a device. Multiple camera modules may be placed closely adjacent to one another by utilizing a recessed portion of the respective perimeters, such as by having one corner removed from rectangular perimeters. By aligning two such recessed portions two camera modules may be more placed more closely together, thereby reducing the distance between the apertures of the respective camera modules. Within asymmetric camera modules, individual components, such as magnets, coils, damping pins, gel pockets, etc., may be asymmetrically placed to correspond with, or in response to the reduced space resulting from the asymmetry of the camera module outline.

20 Claims, 8 Drawing Sheets

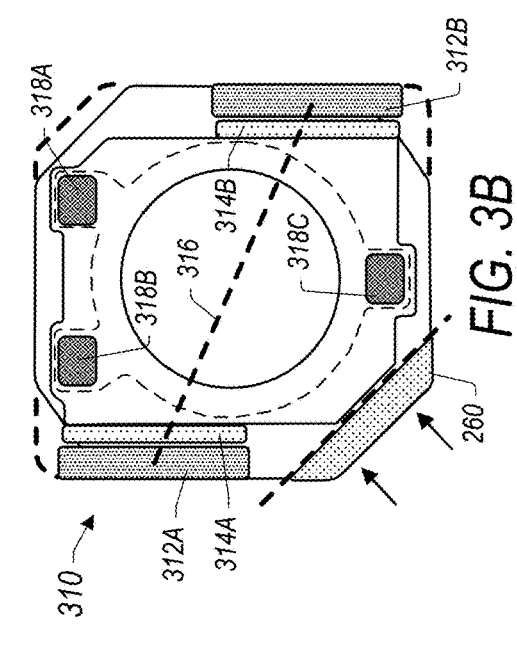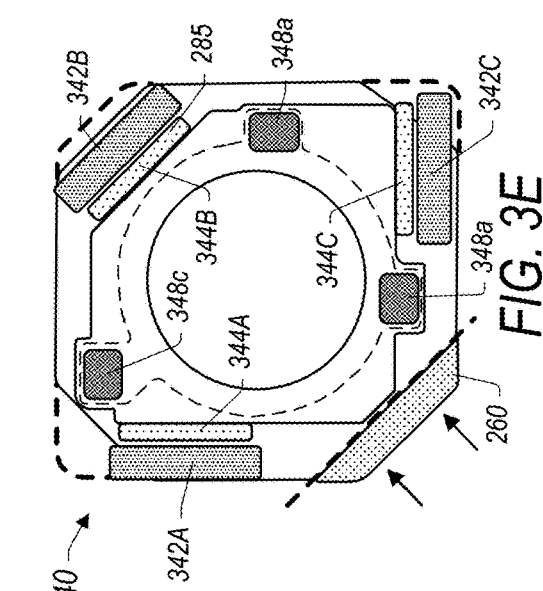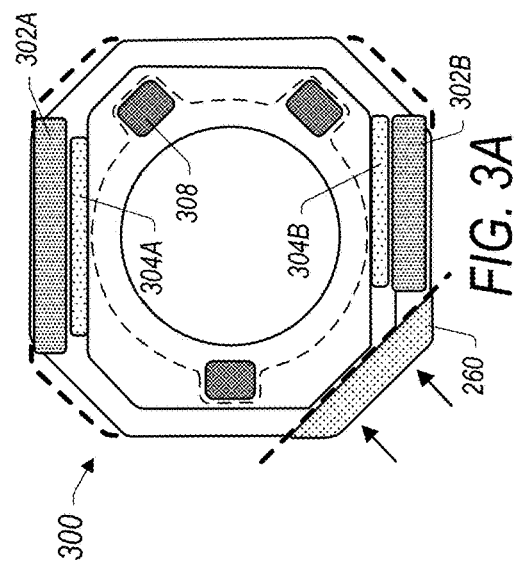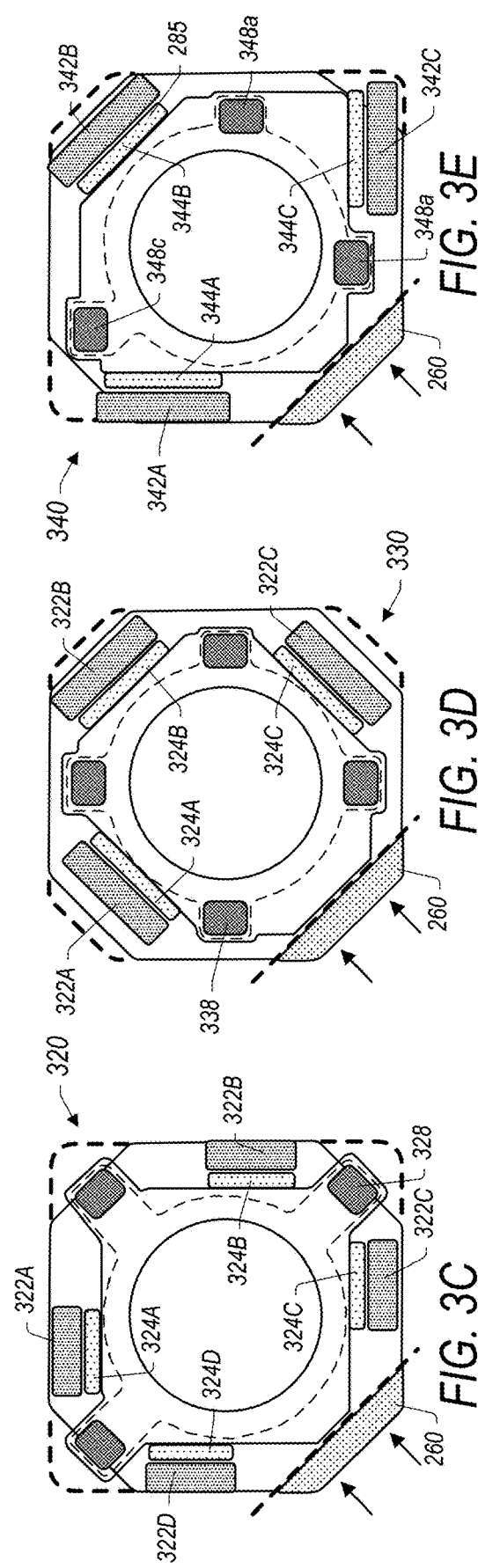
FIG. 3A, FIG. 3B, FIG. 3C, FIG. 3D, FIG. 3E

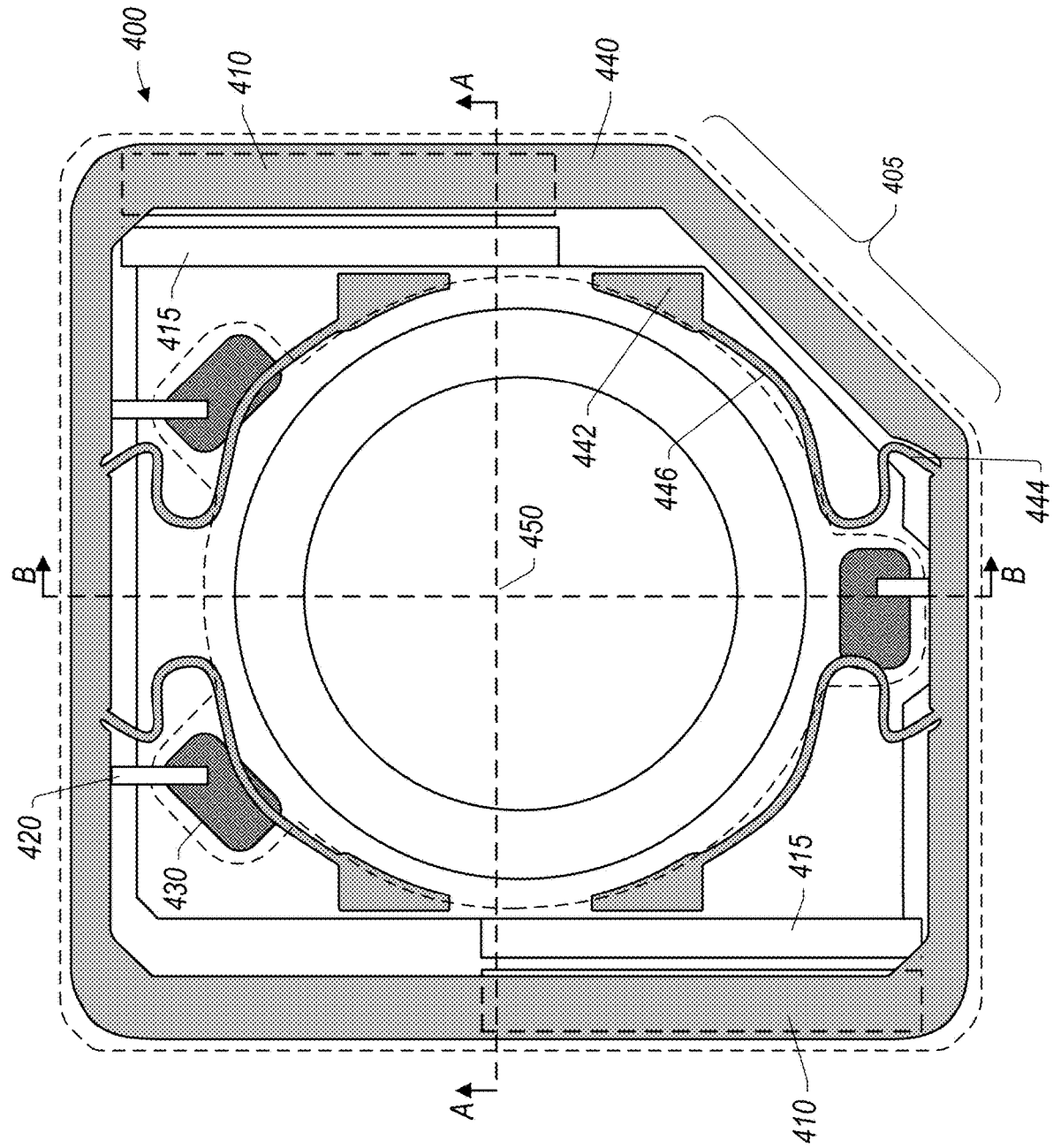

ASYMMETRIC COMPONENT ARRANGEMENT WITHIN SMALL FORM FACTOR CAMERAS

BACKGROUND

This application claims benefit of priority to U.S. Provisional Application Ser. No. 63/143,722, entitled "Asymmetric Component Arrangement within Small Form Factor Cameras," filed Jan. 29, 2021, and which is hereby incorporated herein by reference in its entirety.

TECHNICAL FIELD

This disclosure relates generally to design, placement and packaging of cameras and camera modules within devices including small form factor cameras.

DESCRIPTION OF THE RELATED ART

The advent of small, mobile multipurpose devices such as smartphones and tablet or pad devices has resulted in a need for high-resolution, small form factor cameras for integration in the devices. Some small form factor cameras may incorporate an autofocus (AF) mechanism whereby the object focal distance can be adjusted to focus an object plane in front of the camera at an image plane to be captured by the image sensor. In some autofocus mechanisms, the optical lens is moved as a single rigid body along the optical axis of the camera to refocus the camera. Small form factor cameras may also include mechanisms for resisting or damping motion, such as may be caused by an AF mechanism.

SUMMARY OF EMBODIMENTS

Small form factor cameras that may include one or more voice coil motor actuators, one or more springs and/or one or more motion damping mechanisms. Multiple cameras or camera modules may be positioned close together within a device. Multiple camera modules may be placed closely adjacent to one another by utilizing a recessed portion of the respective perimeters, such as by having one corner removed from rectangular perimeters. By aligning two such recessed portions two camera modules may be more placed more closely together, thereby reducing the distance between the apertures of the respective camera modules. Within asymmetric camera modules, individual components, such as magnets, coils, damping pins, gel pockets, etc., may be asymmetrically placed to correspond with, or in response to the reduced space resulting from the asymmetry of the camera module outline.

For example, an asymmetric camera module may include a voice coil motor actuator that include a plurality of magnets and at least one drive coil. The magnets and coil(s) of the actuator may be configured to move a dynamic portion of the camera module relative to a static portion of the camera module. For instance, in one embodiment the magnets may be couple to a stationary base while the coil(s) may be coupled to a lens carrier (e.g., that holds a lens barrel, a group of lenses, etc.) such that the actuator can move he lens carrier in relation to the base and along the optical axis, such as to perform auto-focus functionality.

A perimeter of the camera module may have a recessed portion resulting in the camera module exhibiting an asymmetry in respect to at least one axis. A distance from the center of camera's lens(es) of the camera module to the recessed portion of the perimeter may be smaller than a distance from the center of the lens(s) to other portions of the perimeter. Because of the recessed portion of the perimeter, the placement of the magnets and/or coil(s) of the actuator may be constrained resulting in an asymmetric arrangement in respect to at least one axis.

BRIEF DESCRIPTION OF THE DRAWINGS

FIGS. 3A-3E are logical diagrams illustrating example asymmetric camera modules, according to some embodiments.

FIGS. 4A-4C are logical diagrams illustrating various views of an asymmetric camera module, according to one embodiment.

Figure 1A:
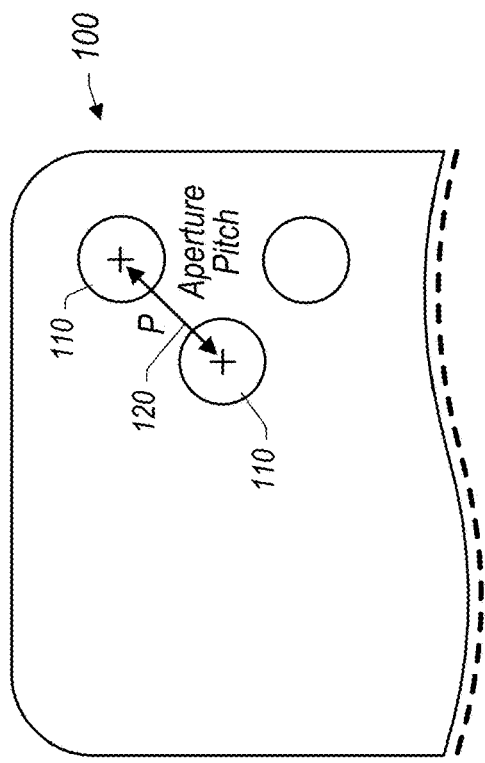
FIG. 1A is a logical block diagram illustrating an example device including multiple cameras, according to one embodiment.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Described herein are embodiments for small form factor cameras including a voice coil motor actuator including one or more magnets and one or more drive coils. A small form factor camera may also include one or more motion damping mechanisms (e.g., gel pockets and damping pins). Small form factor cameras may be utilized in various devices, such as mobile phones, tablets, handheld video game devices, laptops, etc. In some embodiments, it may be advantageous to place multiple cameras within a device and it may be further advantageous to place those cameras close together. Thus, close adjacent packaging of camera modules may be of continued interest in mobile device system integration strategies. For example, one implementation of adjacent packaging may be to align modules on a diagonal, such as having the camera apertures aligned on a 45-degree angle relative to the camera modules outline. Such a diagonal packaging may create unique pressure on the outline of individual camera module given the need to conserve space and to reduce the pitch distance between respective apertures of adjacent camera modules.

According to various embodiments, a diagonal dimension between the center of a camera aperture and a particular portion of the outer edge (e.g., of the perimeter) of the camera module may be reduced. For example, a camera module with a substantially square perimeter shape may have three corners in which the two adjacent edges meet at (or close to) 90 degrees (not counting any rounding of the corner tip), while a fourth corner may be "cut" such that an additional edge is created between two sides of the module (where each side meets the additional edge at less than 90 degrees), thereby reducing the distance between the lens center and the outer edge at that corner. Two camera modules, each with a "cut" corner (located at opposite corners) may then be placed more closely adjacent than camera modules without any cut corners.

While described herein as having cut or missing corners, asymmetric camera module may have different shapes. In general, any concave, compressed, recessed, hollow, inwardly cupped or sunken portion of a camera module's perimeter may result in an asymmetric perimeter and therefore an asymmetric camera module as described herein. As used herein, a recessed portion of a camera module's perimeter or outline may refer to any concave, compressed, inwardly cupped or sunken portion of the camera module's perimeter that allows two such modules to be place more closely adjacent than if neither perimeter had such a recessed portion. For example, in some embodiments, a cut corner, as described above may represent such a recessed portion of a camera module perimeter.

In some embodiments reducing and/or minimizing a diagonal distance between the lens center and a particular portion of the perimeter may result in an asymmetric camera outline or perimeter (i.e., asymmetric with respect to at least one axis). An asymmetric camera outline may in turn affect the design and/or placement of various components within the camera module. For example, in some embodiments, an asymmetric camera outline may affect or dictate the placement of an auto focus voice coil motor actuator, sensing mechanisms, and/or damping mechanisms within the camera module.

As used herein, asymmetric camera module designs may include outlines that do not exhibit a strict X/Y symmetry, diagonal and/or rotational symmetry may be maintained and/or preserved in some embodiments.

FIG. 1 is a logical block diagram illustrating a portion of a device including multiple cameras according to one embodiment. As shown in FIG. 1A, multiple camera apertures 110 may be exposed by the case of device 100. As described above, the aperture pitch P, as represented by line 120, between two cameras may be reduced and/or minimized by positioning the cameras on a diagonal alignment (rather than on a strict orthogonal alignment). In some embodiments, a recessed portion of a module's perimeter may be utilized in the overall outline of individual camera modules, thereby allowing the apertures of the individual camera modules to be placed closer together (i.e., reducing the aperture pitch between the two cameras).

Figure 1C:
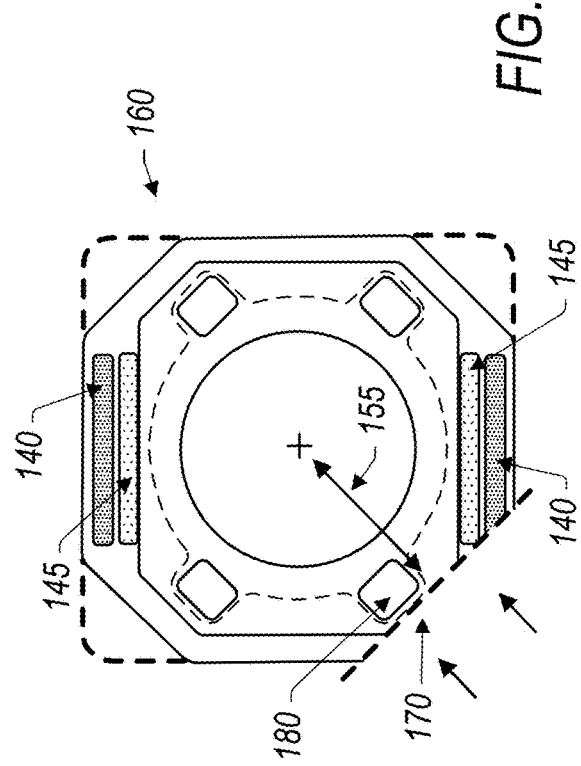
FIG. 1B and FIG. 1C are logical diagrams illustrating symmetric and asymmetric camera outlines, according to various embodiments.
Figure 1B:
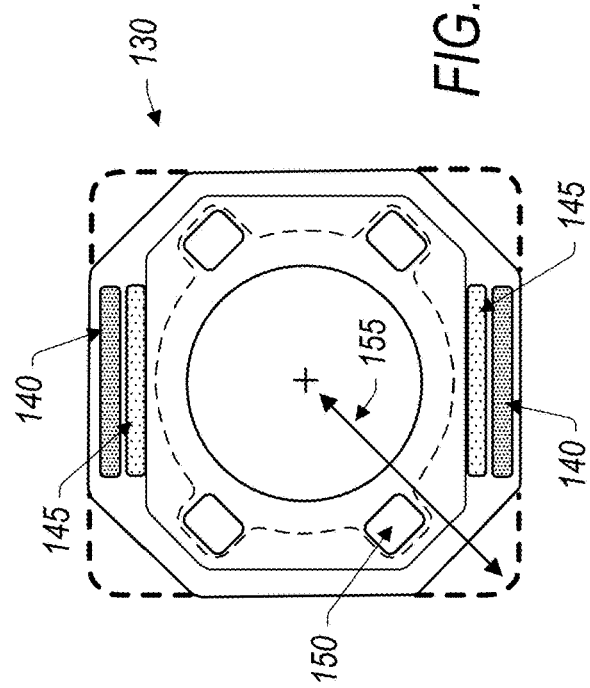

FIG. 1B and FIG. 1C are logical block diagram illustrating examples of both symmetric and asymmetric camera outlines, according to various embodiments. As shown in FIG. 1B, camera module 130 includes a symmetric outline.

That is camera module 130 has an outline, represented by the dashed lines, that exhibits an X/Y symmetry (as well as a diagonal symmetry). The camera module 160 shown in FIG. 1C includes an outline that does not exhibit an X/Y symmetry due to corner 170 being removed. A comparison of FIG. 1B with FIG. 1C illustrates that the diagonal distance 155 from the aperture center to the corner edge may be reduced by utilizing a cut corner 170. Please note that the particular cut corner 170 illustrated in FIG. 1C is merely one example and that any, multiple or all, corners of a camera module outline may be removed, reduced or "cut" according to various embodiments.

Thus, in some embodiments, two camera modules may be placed closer together, thereby reducing the aperture pitch between the two modules, if one or both camera modules utilize asymmetric outlines, such as illustrated in FIG. 1C. For example, if two camera modules 160 are placed such that one is rotated 180 degrees relative to the other, the two "cut" corners 170 may be placed adjacent to each other, thereby reducing and/or minimizing the aperture pitch (i.e., the distance between the aperture centers of the cameras), according to one embodiment. Due to the recessed portion of the camera module perimeter (e.g., the cut corner 170) illustrated in FIG. 1C, there may not be room near that recessed portion (e.g., the cut corner 170) to fit one or more components, such as gel pocket 180, the magnet 140 and/or the coil 145 located along the lower edge. As illustrated in FIG. 1C the recessed portion may overlap and reduce the space available for components in that area within the camera module.

As noted above, in some embodiments, a recessed portion of a camera module's outline or perimeter, such as to reduce the distance from the aperture center to outer edge, may affect and/or dictate the particular features within the camera module. For instance, in some embodiments, the specific nature of a camera module's outline may affect and/dictate the particular design, arrangement and/or placement of individual components within the camera module, such as the design, arrangement and/or placement of AF, VCM and/or motion damping components within the camera module.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 2:
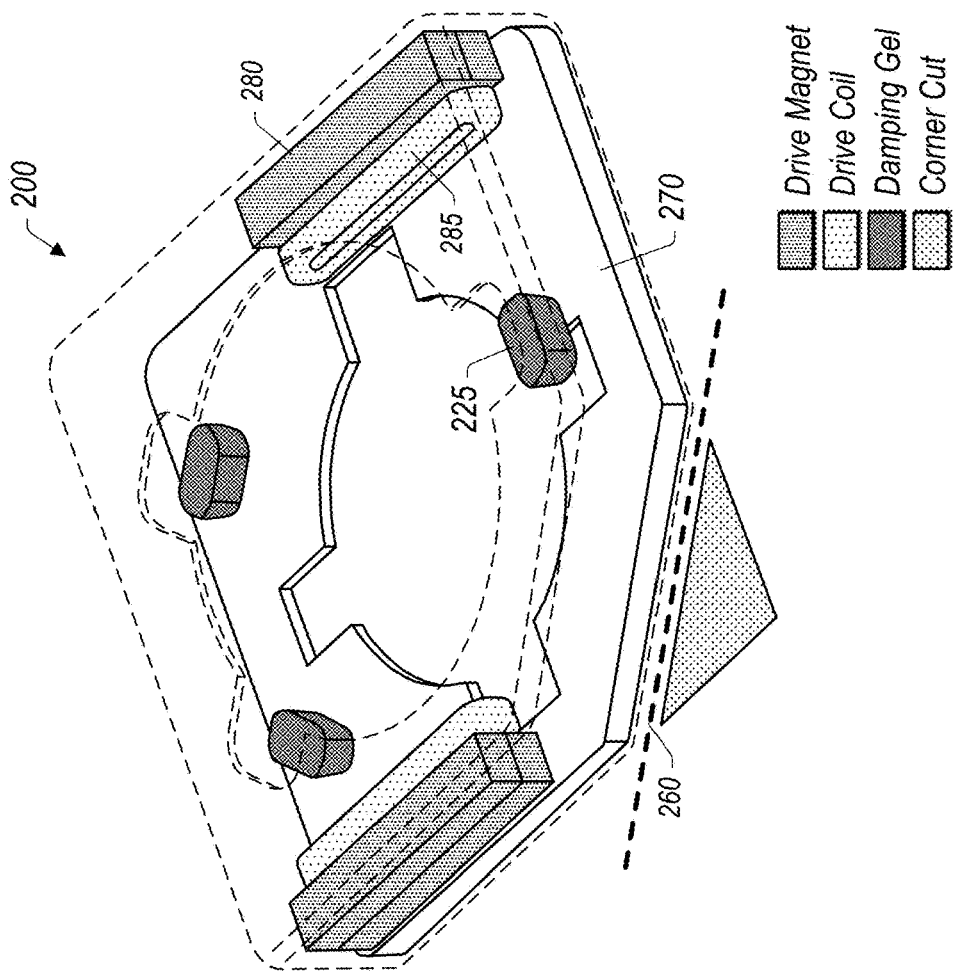
FIG. 2 is a logical diagram illustrating an example asymmetric camera module, according to one embodiment.
Figure 2:
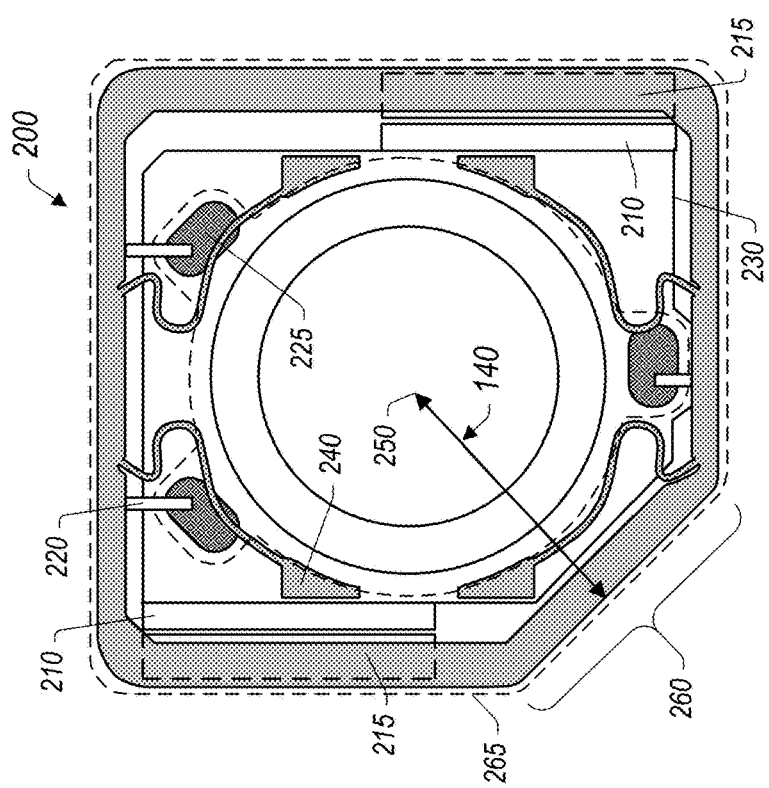

FIG. 2 illustrates both a top-down view and a 3D perspective view of an asymmetric camera module according to one embodiment. As illustrated in FIG. 2, camera module 200 may include (e.g., may be shaped to include) an overall outline that does not exhibit X/Y symmetry, such as due to the particular shape of corner 260. In some embodiments, one or more corners of a camera module outline may not be present, thus resulting in a missing, or "cut" corner. The term "cut corner" as used herein may refer to any recessed portion of a camera module's outline that results in an asymmetry along at least one axis (and does not necessarily refer specifically to a corner of a camera module having been cut or removed during a manufacturing process). As described above, a recessed portion (e.g., a cut corner) of the module perimeter may reduce the distance from the lens center to the outer edge near that recessed portion and may allow two such camera modules to be places more closely adjacent (e.g., by aligning two cut corners).

As shown in FIG. 2, the particular shape/design of camera module 200, such as corner 260, may reduce and/or minimize diagonal distance 155 between aperture center 250 and an edge (e.g., at corner 260). However, a reduction of diagonal distance 155 may affect placement of various components within camera module 200. The specific design of AF VCM magnetics, sensing and damping architectures within camera module 200 may reflect and/or be driven by the size and shape of a recessed portion of the outline or perimeter 265 of camera module 200. For instance, the specific design and/or placement of one or more VCM actuator coils 210 and/or VCM actuator magnets 215 may reflect or be constrained by the reduced space within camera module 200 due to a recessed portion of the perimeter 265 (e.g., a cut corner). Similarly, the design and/or placement of one or more motion damping mechanisms, such as damping pins 220 and gel pockets 225, may in turn be driven by both the recessed perimeter portion of camera module 200 as well as the particular design/placement of the VCM actuator magnets and coils, according to some embodiments.

In various embodiments, the camera module 200 may include an actuator for translating or otherwise moving a lens group of one or more lenses. For example, a lens group may be coupled with an actuator (e.g., couple with one or more coils of an AF VCM actuator) configured to move the lens group to provide autofocus (AF) functionality. For example, the actuator may linearly translate the lens group in a direction parallel to the X-axis to provide AF movement. In some embodiments, the actuator may be coupled with a lens carrier that in turn is connected to a lens barrel that holds or contains the lens(es).

A voice coil motor (VCM) actuator may include one or more stationary magnets (e.g., magnet 215) and one or more moveable coils (e.g., drive coils 210). In some embodiments, a VCM actuator may control movement of a dynamic portion of the camera module, such as a lens carrier within a carrier frame 230 of the camera module (e.g., to perform auto focus adjustments). In some embodiments, the stationary magnet may be attached to a base structure 270 and positioned proximate the coil. The coil may be attached to the carrier, such that the coil moves together with the carrier. Thus, in some embodiments, a camera module may contain at least one static portion (e.g., one or more static or stationary components, such as base structure 270) and at least one dynamic or moveable portion (e.g., one or more moveable components, such as carrier 230).

In some embodiments, camera module may include a dynamic (i.e., moveable) portion and a static (i.e., non-moving) portion, where the dynamic portion is able to move relative to the static portion. A VCM actuator may be configured to move the dynamic portion relative to the static portion. For example, a lens carrier, lens barrel and/or one or more members may be considered a dynamic portion of a camera module while a base structure of the camera module may be considered a static portion. However, in some embodiments, a camera may include an image sensor as a dynamic portion that is capable of moving relative to a static portion that includes the lenses. In various embodiments, the magnet and the coils may be configured to magnetically interact to move the dynamic portion (e.g., an image sensor or a lens) along the optical axis, e.g., to provide autofocus functionality.

In some embodiments, one or more suspension springs 240 may mechanically connect a lens carrier to a carrier frame in which the lens carrier is mounted and may allow and/or guide movement of the lens carrier in the same direction as an optical axis of the camera but may prevent or restrict motion of the lens carrier relative to the carrier frame in directions orthogonal to the optical axis. Thus, suspension springs 240 may be configured to guide motion of a lens carrier (or other dynamic portion), according to some embodiments.

Additionally, one or more damping mechanisms, such as damping pins 220 and matching gel pockets 225, may retard or reduce extraneous motion related to AF adjustments. In various embodiments, a damper mechanism may include a viscoelastic material and an interface member. The viscoelastic material may be at least partially disposed within a pocket (e.g., a gel pocket). For instance, the pocket may be defined by the stationary component and/or the lens carrier. The interface member may extend from the stationary component and/or the lens carrier to at least partially into the viscoelastic material. In some examples, the interface member may be a rigid member (e.g., a damping pin). Furthermore, the interface member may be configured to traverse within the viscoelastic material to dampen motion of the lens carrier, e.g., during operation of the actuator to move the lens carrier along the optical axis.

According to some embodiments, the camera module 200 may include one or more set of damping pins 220 and matching gel pockets 225 (or other damping mechanisms) configured to dampen motion of the lens carrier, e.g., during actuation. In some embodiments, a first portion of a respective damping pin 220 may be attached to a stationary structure (e.g., a base structure of the camera module). The damping pin may extend (e.g., in the X-axis direction) towards a gel pocket 225 (and/or a cavity, a recess, or the like) which may contain a viscoelastic material. In some embodiments, a gel pocket may be defined by a cavity or other portion of the lens carrier.

In some embodiments, a second portion of the damping pin 220 may be disposed within the viscoelastic material contained in the gel pocket 225, so as to interface with the viscoelastic material to dampen motion. In some embodiments, the second portion of the damping pin 220 (disposed within the viscoelastic material) may be distal to the first portion of the damping pin 220. The damping pin 220 may include one or more bends allowing the second portion to extend in a different direction (e.g., the Z-axis direction) than the first portion. While in some embodiments, the particular arrangement and/or placement of damping pins (and gel pockets) within a camera module may include multiple groups of damping pins (and gel pockets) forming a damping arrangement having mirror symmetry (between a first damping group and a second damping group) with respect to the X-Z plane, in other embodiments damping pins and gel pockets may be placed and/or arranged to exhibit asymmetry with respect to at least one axis. For example, as shown in FIG. 2, camera module 200 includes three damping pins 220 (and three corresponding gel pockets 225) arranged in an asymmetric manner in relation to the X axis (and in relation to a diagonal axis), but which maintains symmetry in relation to the Y axis.

In some embodiments, an AF VCM actuator may include one or more magnets and one or more coils that electromagnetically interact with one another to produce Lorentz forces that move the lens carrier relative to the base structure 270. For example, the magnet 280 may be positioned proximate the drive coil 285 so that they are capable of electromagnetically interacting with one another to move the lens carrier relative to the base structure 270, such as to perform AF adjustments. In some embodiments, the drive magnet 280 may be attached to a stationary structure, such as the base structure 270. The drive coil 285 may be attached to a dynamic portion of the module, such as the lens carrier.

Note that while described herein as involving moving a lens carrier (and therefore a lens barrel and one or more lens) to perform AF adjustments, in some embodiments, an AF VCM actuator may be coupled with, and move, an image sensor while the lenses remain stationary.

While described herein mainly as including a voice coil motor (VCM) actuator, in some embodiments, camera module 200 may additionally, or alternatively, include one or more other types of actuators such as a piezoelectric actuator, a comb drive actuator, etc.

In some embodiments camera module 200 may include one or more springs 240 (e.g., sheet springs) configured to suspend the carrier from the base structure and to guide motion enabled by the actuator. As with the actuator magnets, coils, gel pockets 225 and damping pins 220, the particular design, placement and/or arrangement of springs (e.g., spring arrangement 240) may be affected or driven by a recessed portion of the camera module's perimeter or outline. Additionally, placement of the springs may be constrained by the amount of space available, such as due to recessed portion of the perimeter, but the springs may have particular features due to the asymmetry of actuator magnets and coils. For example, actuator magnets and/coils may be placed in an asymmetric arrangement thereby causing the Lorentz forces not to align symmetrically or with the center of mass of the camera lenses (lens barrel, carrier, etc.). Therefore, in some embodiments, spring arrangement 240 may include springs with varying characteristics (e.g., stiffness) to contend with (e.g., to balance) the asymmetry of the actuator magnets and/or coils.

FIG. 3A-3E are logical block diagrams illustrating example asymmetric camera modules, according to various embodiments. Additionally, FIGS. 3A-3E illustrate a comparison of example arrangement of components within an asymmetric camera module with an arrange of components within a similarly sized symmetric camera module. For instance, FIGS. 3A-3E illustrate asymmetrically arranged components using various shades while corresponding symmetrically arranged components are illustrated using unshaded outlined. For example, compare gel pockets 308 arranged within asymmetric camera module 300 with gel pockets 338 with a symmetric arrangement within a similarly sized asymmetric camera module 330.

The camera modules (e.g., camera modules 300, 310, 320, 330 and 340) of FIGS. 3A-3E have an asymmetry introduced by a recessed perimeter portion, such as a missing or cut corner 260. As described above, a recessed perimeter portion may reduce a diagonal distance between the aperture center and the outer edge of the camera module in the area of the recessed portion, which in turn may reduce or minimize the aperture pitch between two adjacent camera modules.

Referring now to FIG. 3A, camera module 300 includes an AF VCM actuator that utilized two magnets 302 and two drive coils 304, according to one embodiment. In some embodiments, the magnets of the actuator may have two magnetization directions, while other types of magnets (e.g., single magnetization direction) may be used in other embodiments. As shown in FIG. 3A, the magnets of the actuator may not be similarly sized nor placed symmetrically, such as due to a recessed portion of the outer perimeter of camera module 300. For instance, the upper magnet 302A in FIG. 3A may fit within camera module 300 where illustrated (e.g., along the top edge), but might not fit within camera module 300 in an opposite position (e.g., along the bottom edge). Thus, in some embodiments, the lower magnet may not be centered along the bottom edge (e.g., opposite to the upper magnet). The magnets of the actuator may therefore exhibit an asymmetry in regard to at least one axis. Consequently, the combined Lorentz forces produced by the magnets may not be aligned with the center of the lens(es) (or aperture opening) of camera module 300.

Similarly, damping gel pockets 308 may be arranged asymmetrically around a lens carrier, lens barrel and/or aperture of camera module 300 in some embodiments. Additionally, gel pockets 308 may be arranged asymmetrically in order to properly compensate for the placement of the magnets of the actuator (e.g., to properly reduce, retard, and/or minimize extraneous movement related to the Lorentz forces produced by the magnets and coils), according to some embodiments. The particular arrangements of magnets, coils, gel pockets and/or damping pins may be affected and/or driven by the physical space within camera module 300 (which may be reduced due to a recessed portion of the outer perimeter). As shown in FIG. 3A, gel pockets 308 exhibit asymmetry in relation to the Y axis but may exhibit symmetry across the X axis. Thus, in some embodiments, while exhibiting asymmetry in relation to at least one axis, the placement of components within an asymmetric camera module may maintain as much symmetry as allowed (e.g., by the particular shape of the camera module).

Referring now to FIG. 3B, which illustrates an example asymmetric camera module according to one embodiment, camera module 310 may include two actuator magnets 312, two drive coils 314, and three gel pockets 318. As shown in FIG. 3B, magnets 312 and drive coils 314 may be arranged asymmetrically in relation to at least one axis. The exact placement of the actuator magnets and drive coils may be determined, at least in part, based on a recessed portion of the overall module outline (e.g., the outer perimeter), which may result in reducing a diagonal distance between the aperture center and one portion of the perimeter edge (such as at corner 260). Unlike those of camera module 300, the actuator magnets and coils of camera module 310 may be of similar size and shape and may, in some embodiments, be placed in an arrangement such that an imaginary line 316 connecting center points of the magnets may pass through the center of an aperture of camera module 310. Thus, the center of forces produced by actuator magnets and coils within a camera module may or may not align with the center of the lens group, lens barrel and/or the aperture of the camera module, according to various embodiments.

Camera module 310 may also include one or more gel pockets 318 (and matching damping pins) placed in an arrangement to suitably reduce or dampen extraneous motion caused by the actuator performing AF adjustments. A comparison of FIGS. 3A and 3B illustrates that in some embodiments gel pockets and damping pins may be aligned tangentially to a lens barrel (or aperture) as shown in FIG. 3A, but in other embodiments gel pockets and damping pins may not be aligned tangentially to the lens barrel but instead may be aligned to another component or structure of the camera module, as shown in FIG. 3B. In general, gel pockets and damping pins may be arranged and aligned in any of various manners in various embodiments. As described above, the particular placement of gel pockets and damping pins may be based, as least in part, on the space available, the placement (and therefore the subsequent forces applied by) actuator magnets, drive coils, sensor magnets and/or various other components of the camera module.

FIG. 3C is block diagram illustrating another asymmetric camera module, according to one embodiment. As shown in FIG. 3C, four actuator magnets 322 and four drive coils 324 may be arranged to avoid the missing corner 260, but while maintaining a diagonal symmetry. Gel pockets 328 (and matching damping pins) may be placed within the available space in an arraignment suitable to reduce or dampen extraneous movement of the lens(es), lens barrel and/or lens carrier. In some embodiments there may not be available space within the footprint of the camera module (due to the recessed portion of the outer perimeter) to place a fully symmetric arrangement of gel pockets and damping pins. For example, as shown in FIG. 3C, there may not be sufficient space to place a damping pin between the lens carrier/barrel and corner 260. However, damping pins may be placed in an arrangement corresponding to the placement of the actuator magnets and drive coils in order to provide sufficient damping power.

The actuator magnets shown in FIG. 3C may exhibit asymmetry in relation to at least one axis but may be placed in an arrangement allowing the center of the forces produced may align with the center of mass of the camera lens(es)—with the gel pockets and damping pins placed accordingly. In other embodiments, however, the actuator magnets and drive coils of FIG. 3 might be placed more centrally to each edge of the camera module if space allowed. For example, actuator magnet 322D might be placed more closely aligned to the center of the left edge and actuator magnet 322C might be placed more closely aligned to the center of the bottom edge if there was enough space to so without the two actuator magnets being placed too close to corner 260. Note that in regard to camera module 320, the placement of actuator magnets 322 and 323 may be in response to the placement of actuator magnets 322C and 322D since actuator magnets 322C and 322D are the ones constrained by a recessed perimeter portion (e.g., cut corner 260). If actuator magnets 322C and 322D were placed to more aligned with the centers of their respective edges, actuator magnets 322A and 322B might also be placed more centrally (in regard to their respective edges).

Similarly, in some embodiments, gel pockets and damping pins may be placed as symmetrically as possible based on the overall symmetry (or asymmetry) of the camera module and the placement of the actuator magnets and coils. In some embodiments, the arrangement of components (e.g., esp. actuator magnets, coils sensor magnets, gel pockets and damping pins) may maintain as much symmetry as possible given the space allowed within the particular camera module.

Turning now to FIG. 3D, camera module 330 includes an AF VCM actuator including three magnets 332 and three coils 334 as well as four gel pockets and matching damping pins. In contrast to camera module 320, the actuator magnets and drive coils may be placed in the corners (except for missing corner 260) while the gel pockets and damping pins may be aligned to the edges (rather than the corners) and may be centered on the lens(es). Thus, while the gel pockets and damping pins may maintain symmetry (in relation to both the X and Y axis), the actuator magnets and coils may not exhibit symmetry to both the X and Y axis, according to some embodiments. Additionally, in some embodiments gel pockets 338 (and matching damping pins) may be arranged equidistantly around the lens (and/or lens barrel)—in contrast to gel pockets 308, 318, 328 and 348 of camera modules 300, 310, 320 and 340 respectively. While arranging damping pins equidistantly around the lens barrel may produce a more symmetric damping pin arrangement, there may not be sufficient space (esp. between the lens barrel and an asymmetric aspect, or compressed portion, of the camera module outer perimeter, such as cut corner 260).

As shown in FIG. 3E, camera module 340 includes three AF VCM actuator magnets 342, three coils 344 and three gel pockets 348 (and matching damping pins), according to one embodiment. As shown in FIG. 3E, neither the actuator magnets nor the gel pockets may be arranged equidistantly around a lens barrel and additionally neither the actuator magnets nor the gel pockets may be aligned tangentially to the lens (or lens barrel). Instead, AF VCM actuator magnets 342A and 342C may be aligned to the edges of the camera module while actuator magnet 342B may be aligned tangentially to the lens and across a corner of the camera module. Similarly, some gel pockets of a camera module may be aligned tangentially to the lens, such as gel pockets 348a and 348b, while one or more other gel pockets, such as gel pocket 348c, may not (and may be aligned to an edge or other component of the camera module).

Thus, the particular arrangement of actuator magnets, coils, gel pockets and damping pins may vary within camera modules of substantially the same size and shape, according to various embodiments. For instance, while FIGS. 3A-3E all illustrate camera modules of substantially the same size and shape, the particular arrangement of components, such as the actuator magnets, coils, gel pockets and damping pins, may vary considerable from embodiment to embodiment. As described herein, the particular placement of individual components with an asymmetric camera module may correspond to or be dependent on (and/or be at least partially determined by) an amount of space available with the asymmetric camera module outline and the particular shape of the space within the outline, according to various embodiments.

Figure 4B:
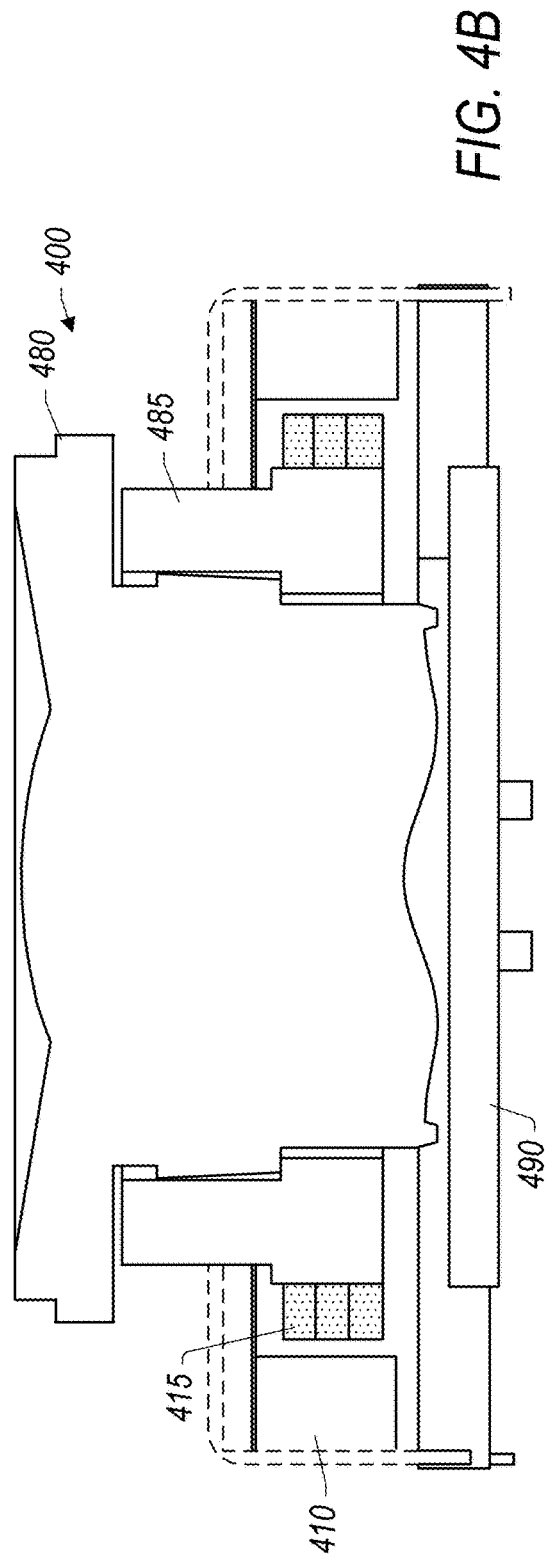
Figure 4C:
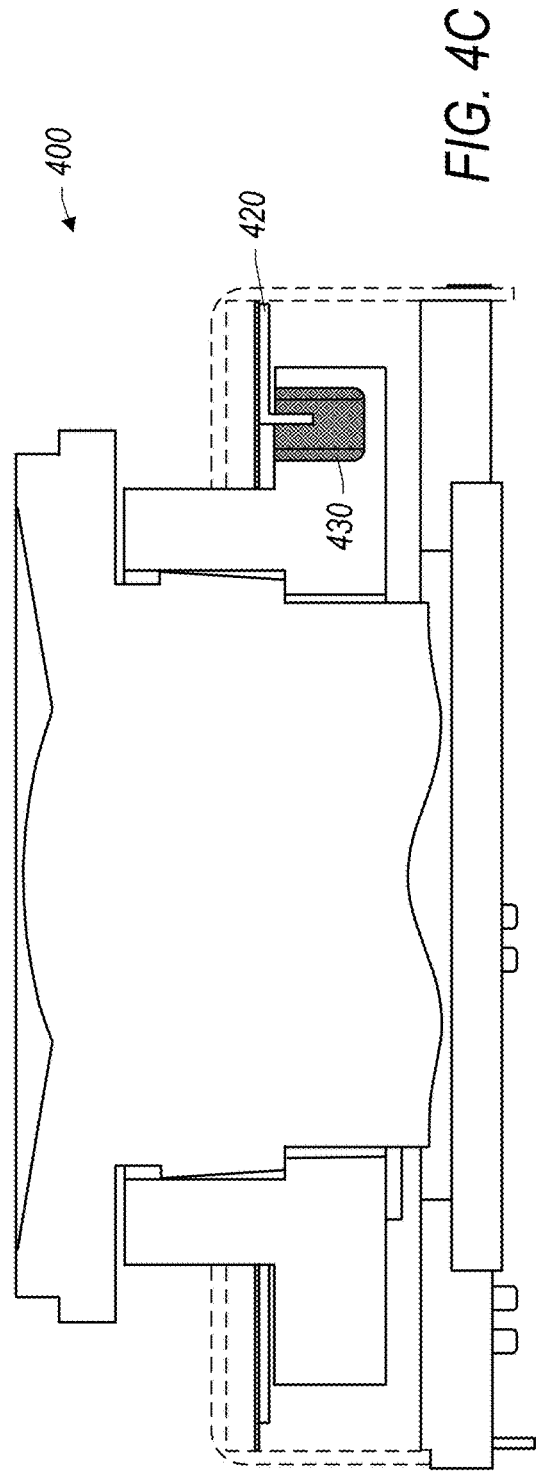

FIGS. 4A-4C are logical diagrams illustrating various views of an asymmetric camera module, according to one embodiment. FIG. 4A illustrates a top-down, or plan, view of asymmetric camera module 400, while FIGS. 4B and 4C illustrate two section views through the camera module 400. Camera module 400 is similar to camera module 200 described above but represents a mirror of camera module 200. Cut corner 260 is in the lower left of camera module 200 while cut corner 405 is in the lower right of camera module 400. Additionally, while the gel pockets and damping pins of camera module 400 are in substantially the same arrangement and locations as the damping pins of camera module 200, the magnet and coils of the AF VCM actuator in camera module 400 are located in an arrangement that mirrors (vertically as shown in the FIGs) those of camera module 200.

As shown in FIG. 4A, the particular shape/design of the outer perimeter of camera module 400 may exhibit an asymmetric portion, such as corner 405, which may remove, reduce or otherwise minimize the diagonal distance between lens center 450 and an edge (e.g., at corner 405). Thus, in an asymmetric camera module, a distance from a center of the lenses to an edge corresponding to the asymmetric portion may be reduced as compared to a distance from the center of the lenses to an edge not corresponding to the asymmetric portion. The particular diagonal distance within a camera module may determine (at least partially) placement of various components within that camera module, according to some embodiments.

In various embodiments, the camera module 400 may include an AF VCM actuator for translating or otherwise moving a lens group of one or more lenses. For example, a lens group may be coupled with one or more actuator drive coils configured to interact with matching magnets to move the lens group to provide autofocus (AF) functionality. For example, the actuator may linearly translate a lens group within the camera module in a direction to provide AF movement and/or adjustment.

Thus, the specific design of the AF VCM actuator (e.g., placement of magnets and coils), sensing magnets, gel pockets, damping pins and/or springs within camera module 400 may reflect and/or be driven by a recessed portion of the outer perimeter of camera module 400. For instance, the specific design and/or placement of one or more VCM actuator magnets 410 and/or coils 415 may reflect and/or be driven by the recessed portion of the outer perimeter of camera module 400 near cut corner 405. Additionally, the design and/or placement of the actuator magnets 410 and coils 415 in conjunction with the available space within the camera module may determine (at least partially) the placement and/or arrangement of one or more motion damping mechanisms, such as damping gel pockets 430 (and corresponding damping pins 420), according to some embodiments.

Referring now to FIGS. 4B and 4C, a voice coil motor (VCM) actuator may include one or more stationary magnets 410, such as magnet that have two magnetization directions, and one or more dynamic or moveable drive coils 415. In some embodiments, the VCM actuator may control movement of a lens and/or lens carrier within a carrier frame of the camera to perform auto focus adjustments. In FIGS. 4B and 4C, reference number 480 may represent a lens group, a lens barrel and/or a lens carrier, according to various embodiments. In some embodiments, a stationary magnet 410 may be attached to the base structure 490 and positioned proximate coil 415. The coil may be attached to the carrier 485, such that the coil moves together with the carrier. In some embodiments, one or more springs may mechanically connect a lens carrier to a carrier frame in which the lens carrier is mounted and may guide for movement of the lens carrier in a same direction as an optical axis of the camera but may prevent motion of the lens carrier relative to the carrier frame.

While described herein as mainly involving AF VCM actuators that include magnet that have two magnetization directions and driver coils arranged in linear fashion adjacent to the respective magnets, in some embodiments, an asymmetric camera module may include a driver coil arranged in a circular fashion around a lens barrel (or lens carrier)—provided there is enough space in the camera module to fit the coil between the barrel/carrier and the edge at the perimeter of the camera module (i.e., between the barrel/carrier and a cut corner).

Additionally, one or more pairs of gel packets and damping pins may retard or reduce extraneous motion related to AF adjustments. According to some embodiments, the camera module 400 may include one or more pairs of gel pockets 430 and damping pins 420 that may be configured to dampen motion of the lens carrier, e.g., during actuation related to AF adjustment. As described above regarding FIG. 2, in some embodiments a first portion of a respective damping pin may be attached to a stationary structure (e.g., a base structure of the camera module). The damping pin may extend (e.g., in the X-axis direction) towards a pocket 430 (and/or a cavity, a recess, or the like) which may contain a viscoelastic material. The pocket may be defined by a portion of the lens carrier. In some embodiments, a second portion of the damping pin 420 may be disposed within the viscoelastic material contained in the pocket 430, so as to interface with the viscoelastic material to dampen motion. In some embodiments, the second portion of the damping pin 420 (disposed within the viscoelastic material) may be distal to the first portion of the damping pin 420. The damping pin may include one or more bends allowing the second portion to extend in a different direction (e.g., the Z-axis direction) than the first portion.

In some embodiments, the AF VCM actuator may include one or more magnets and one or more matching drive coils that electromagnetically interact with one another to produce Lorentz forces that move the lens carrier 485 (and thereby lens barrel 480) relative to the base structure 490. For example, the drive magnet 410 may be positioned proximate the drive coil 415 so that they are capable of electromagnetically interacting with one another to move the lens carrier 485 relative to the base structure 490, such as to perform AF adjustments. In some embodiments, the drive magnet 410 may be attached to a stationary structure, such as the base structure 490. The drive coil 415 may be attached to a dynamic portion of the module, such as the lens carrier 485.

In some embodiments, a spring suspension arrangement 440 may include one or more springs. The spring suspension arrangement 440 may comprise multiple spring portions that function in different manners. For example, a spring may include a first spring portion 442, a second spring portion 444, and a third spring portion 446. The first spring portion 442 may be attached to the lens carrier or barrel 480. The second spring portion 444 may be attached to the base structure of the camera model. The third spring portion 446 may interconnect the first spring portion 442 with the second spring portion 444.

Figure 5:
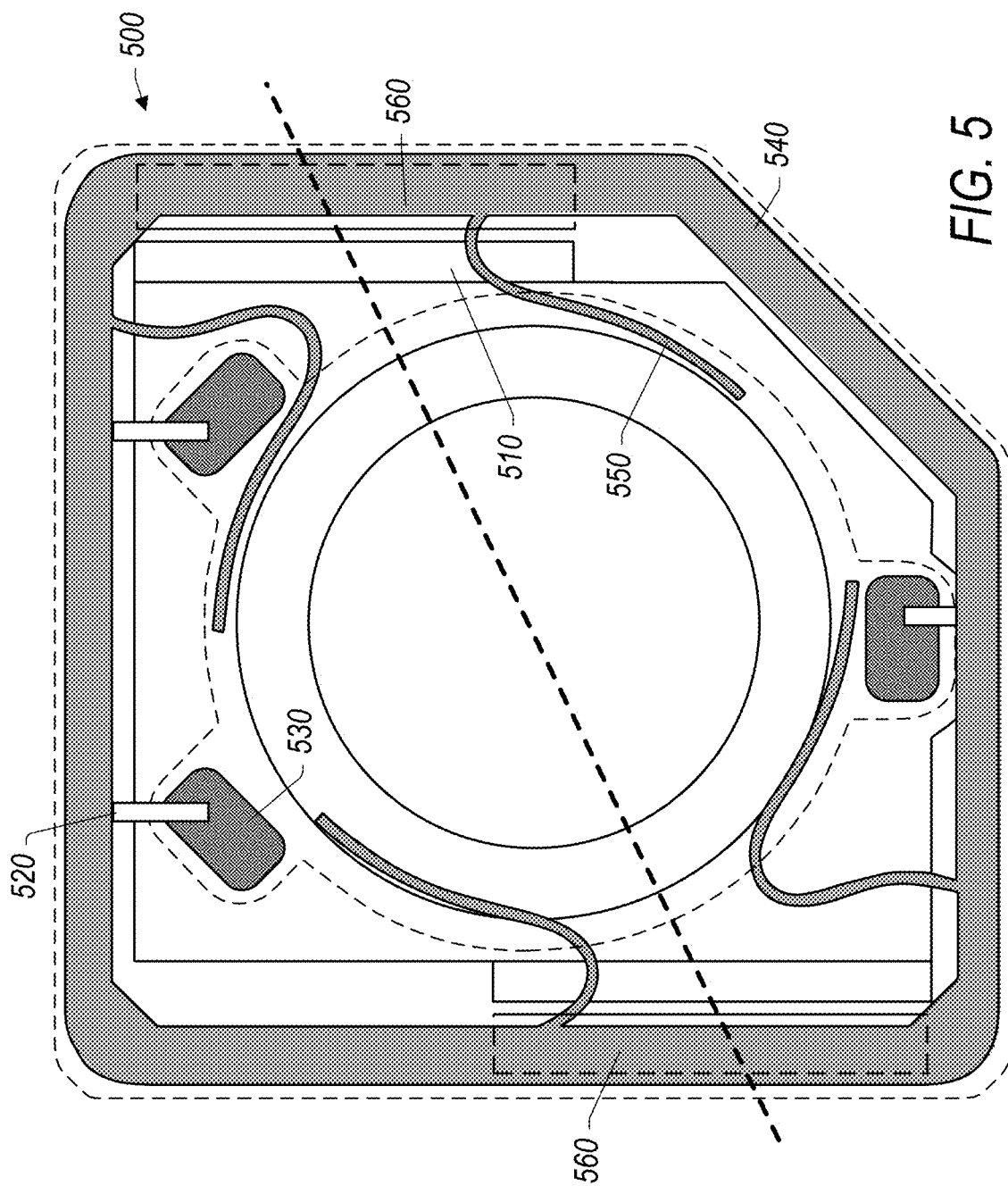
FIG. 5 is a logical diagram illustrating an example spring arrangement according to one embodiment.

FIG. 5 is a logical diagram illustrating an example spring arrangement according to one embodiment. In some embodiments, an asymmetric camera module 500 may include an asymmetric spring suspension arrangement 540. For instance, FIG. 5 illustrates an alternate spring arrange for camera module 400. While actuator magnets 560, drive coils 510, damping pins 520 and gel pockets 530 may be placed in an arrangement substantially similar to actuator magnets 410, drive coils 415, damping pins 420 and gel pockets 430 (shown in FIG. 4A), the springs 550 illustrated in FIG. 5 are placed in a substantially different (and asymmetrical) arrangement than the springs shown in FIG. 4A.

Due to the asymmetry of the placement of actuator magnets and/or coils, the routing and/or stiffness of the individual springs 550 may vary from one another. For example, one spring may be stiffer than another. Additionally, the particular routing of individual springs may vary and be determined by a need to correspond to the asymmetry of actuator magnets and/or coils since an asymmetric arrangement of actuator magnets and/or coils may cause the produced Lorentz forces to not be aligned with the center of mass of the dynamic portion (e.g., the lens(es), lens barrel, etc. or in some cases an image sensor).

Thus, the design, placement and/or arrangement of springs within an asymmetric camera module may vary from embodiment to embodiment and even from two substantially similar camera module outlines. Additionally, the routing and/or characteristics (e.g., stiffness, etc.) of individual springs in an arrangement of springs may vary from one another, such as to properly contend with and/or balance the forces caused by an asymmetry of actuator magnets and/or coils.

Figure 6:
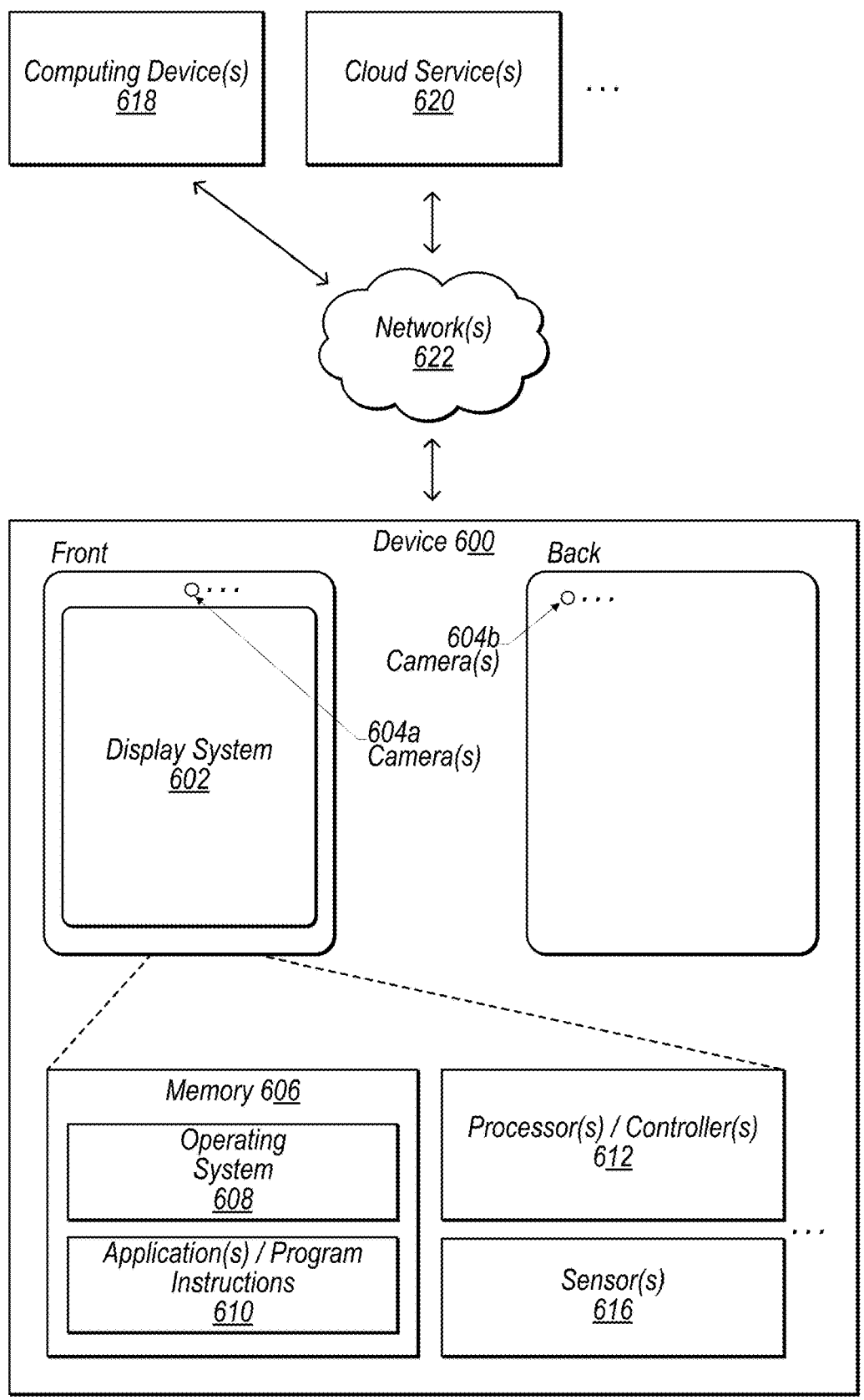
FIG. 6 illustrates a logical block diagram representing an example device that may include one or more asymmetric camera modules, as in some embodiments.

FIG. 6 illustrates a logical diagram representing an example device 600 that may include one or more asymmetric camera modules (e.g., camera 200 in FIG. 2) each possibly including an actuator (e.g., an AF VCM actuator), one or more damping mechanisms (e.g., damping pins and corresponding gel pocket), one or more springs and/or a spring suspension arrangement, e.g., as described herein with reference to FIGS. 1-5 above. In some embodiments, the device 600 may be a mobile device and/or a multifunction device. In various embodiments, the device 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, mobile phone, video game console, handheld video game device, application server, storage device, a television, a video recording device, a peripheral device such as a switch, modem, router, or in general any type of computing or electronic device.

In some embodiments, the device 600 may include a display system 602 (e.g., comprising a display and/or a touch-sensitive surface) and/or one or more cameras 604. In some non-limiting embodiments, the display system 602 and/or one or more front-facing cameras 604a may be provided at a front side of the device 600, e.g., as indicated in FIG. 5. Additionally, or alternatively, one or more rear-facing cameras 604b may be provided at a rear side of the device 600. In some embodiments comprising multiple cameras 604, some or all of the cameras may be the same as, or similar to, each other. Additionally, or alternatively, some or all of the cameras may be different from each other. In various embodiments, the location(s) and/or arrangement(s) of the camera(s) 604 may be different than those indicated in FIG. 6.

Among other things, the device 600 may include memory 606 (e.g., comprising an operating system 608 and/or application(s)/program instructions 610), one or more processors and/or controllers 612 (e.g., comprising CPU(s), memory controller(s), display controller(s), and/or camera controller(s), etc.), and/or one or more sensors 516 (e.g., orientation sensor(s), proximity sensor(s), and/or position sensor(s), etc.). In some embodiments, the device 600 may communicate with one or more other devices and/or services, such as computing device(s) 618, cloud service(s) 620, etc., via one or more networks 622. For example, the device 600 may include a network interface (e.g., network interface 710 of FIG. 7) that enables the device 600 to transmit data to, and receive data from, the network(s) 622. Additionally, or alternatively, the device 600 may be capable of communicating with other devices via wireless communication using any of a variety of communications standards, protocols, and/or technologies.

Figure 7:
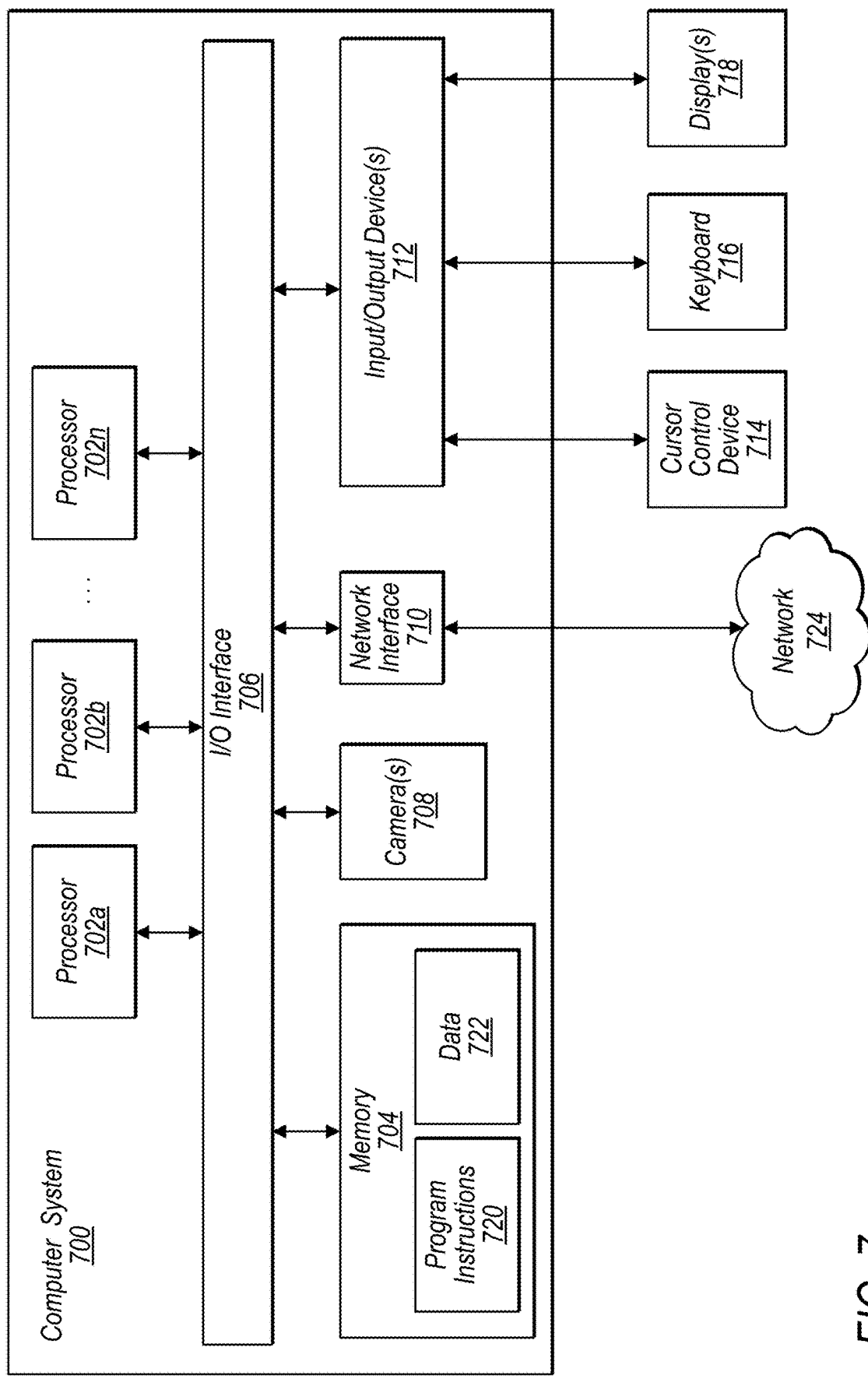
FIG. 7 illustrates a logical block diagram of an example computer system that may include an asymmetric camera module according to one embodiment.

FIG. 7 illustrates a logical block diagram of an example computing device, referred to as computer system 700, that may include or host embodiments of an asymmetric camera module that includes an actuator (e.g., an AF VCM actuator), one or more damping mechanisms, one or more springs and/or a spring suspension arrangement, e.g., as described herein with reference to FIGS. 1-6 above. In addition, computer system 700 may implement methods for controlling operations of the camera and/or for performing image processing images captured with the camera. In some embodiments, the device 600 (described herein with reference to FIG. 6) may additionally, or alternatively, include some or all of the functional components of the computer system 700 described herein.

The computer system 700 may be configured to execute any or all of the embodiments described above. In different embodiments, computer system 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 700 includes one or more processors 702 coupled to a system memory 704 via an input/output (I/O) interface 706. Computer system 700 further includes one or more cameras 708 coupled to the I/O interface 706. Computer system 700 further includes a network interface 710 coupled to I/O interface 706, and one or more input/output devices 712, such as cursor control device 714, keyboard 716, and display(s) 718. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 702, or a multiprocessor system including several processors 702 (e.g., two, four, eight, or another suitable number). Processors 702 may be any suitable processor capable of executing instructions. For example, in various embodiments processors 702 may be general-purpose or embedded processors implementing any of a variety of instruction set architectures (ISAs), such as the x86, PowerPC, SPARC, or MIPS ISAs, or any other suitable ISA. In multiprocessor systems, each of processors 702 may commonly, but not necessarily, implement the same ISA.

System memory 704 may be configured to store program instructions 720 accessible by processor 702. In various embodiments, system memory 704 may be implemented using any suitable memory technology, such as static random-access memory (SRAM), synchronous dynamic RAM (SDRAM), nonvolatile/Flash-type memory, or any other type of memory. Additionally, existing camera control data 722 of memory 704 may include any of the information or data structures described above. In some embodiments, program instructions 720 and/or data 722 may be received, sent or stored upon different types of computer-accessible media or on similar media separate from system memory 704 or computer system 700. In various embodiments, some or all of the functionality described herein may be implemented via such a computer system 700.

In one embodiment, I/O interface 706 may be configured to coordinate I/O traffic between processor 702, system memory 704, and any peripheral devices in the device, including network interface 710 or other peripheral interfaces, such as input/output devices 712. In some embodiments, I/O interface 706 may perform any necessary protocol, timing or other data transformations to convert data signals from one component (e.g., system memory 704) into a format suitable for use by another component (e.g., processor 702). In some embodiments, I/O interface 706 may include support for devices attached through various types of peripheral buses, such as a variant of the Peripheral Component Interconnect (PCI) bus standard or the Universal Serial Bus (USB) standard, for example. In some embodiments, the function of I/O interface 706 may be split into two or more separate components, such as a north bridge and a south bridge, for example. Also, in some embodiments some or all of the functionality of I/O interface 706, such as an interface to system memory 704, may be incorporated directly into processor 702.

Network interface 710 may be configured to allow data to be exchanged between computer system 700 and other devices attached to a network 724 (e.g., carrier or agent devices) or between nodes of computer system 700. Network 724 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 710 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 712 may, in some embodiments, include one or more display terminals, keyboards, keypads, touchpads, scanning devices, voice or optical recognition devices, or any other devices suitable for entering or accessing data by one or more computer systems 700. Multiple input/output devices 712 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 710.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera module, comprising:
   a dynamic portion;
   a static portion that is stationary relative to motion of the dynamic portion;
   an actuator, comprising a plurality of magnets and one or more drive coils, configured to move the dynamic portion relative to the static portion;
   wherein a non-rectangular perimeter of the camera module includes a recessed portion resulting in the camera module exhibiting an asymmetry in respect to at least one axis, wherein a distance from a center of a lens of the camera module to the recessed portion of the non-rectangular perimeter is smaller than a distance from the center of the lens to other portions of the non-rectangular perimeter; and
   wherein placement of the plurality of magnets and the one or more coils is constrained due to the recessed portion of the non-rectangular perimeter such that placement of the magnets is asymmetric in respect to at least one axis.

2. The camera module of claim 1, wherein the plurality of magnets are coupled to the static portion and the one or more drive coils are coupled to the dynamic portion, wherein at least one drive coil is located proximate one of the magnets and is capable of electromagnetically interacting with the magnet to produce Lorentz forces on the dynamic portion.

3. The camera module of claim 1, wherein the dynamic portion comprises a lens carrier including one or more lenses, and wherein the plurality of magnets and the one or more drive coils are configured to move the dynamic portion in a direction along a optical axis of the one or more lenses.

4. The camera module of claim 1, further comprising an image sensor to capture image data based on light transmitted through one or more lenses of the camera module.

5. The camera module of claim 1, further comprising:
   one or more damping mechanisms configured to reduce or dampen movement of the dynamic portion;
   wherein placement of the one or more damping mechanisms is constrained due to the recessed portion and the placement of the one or more coils such that placement of the damping mechanisms is asymmetric in respect to at least one axis.

6. The camera module of claim 5, wherein the damping mechanisms comprise one or more damping pins coupled to the static portion and one or more gel pockets of the dynamic portion, and wherein placement of the one or more gel pockets is constrained by placement of the one or more coils resulting in said asymmetric placement of the damping mechanisms.

7. The camera module of claim 1, further comprising:
   one or more springs configured to suspend the dynamic portion from the base structure and to guide motion enabled by the actuator; and
   wherein the one or more springs are placed in an arrangement constrained at least by: an amount of space available between the dynamic portion and the recessed portion of the perimeter, placement of the plurality of magnets and the one or more coils and placement of damping mechanisms within the camera module.

8. The camera module of claim 7, wherein individual ones of the one or more springs have differing characteristics due to the asymmetric placement of the plurality of magnets and one or more coils resulting in the produced Lorentz forces not being symmetrically aligned with a center of mass of the dynamic portion.

9. A voice coil motor actuator module, comprising:
   a static portion;
   a dynamic portion;
   a plurality of magnets configured to be coupled to the static portion; and
   one or more coils configured to be coupled to a dynamic portion of a camera module;
   wherein the one or more drive coils are located proximate to the plurality of magnets and are capable of electromagnetically interacting with the magnets to produce Lorentz forces to move the dynamic portion relative to the static portion; and
   wherein the voice coil motor actuator module is configured to fit within the camera module having a perimeter that is non-rectangular, the perimeter comprising a recessed perimeter portion resulting in the camera module exhibiting an asymmetry in respect to at least one axis, wherein a distance from a center of a lens of the camera module to the recessed portion of the perimeter is smaller than a distance from the center of the lens to other portions of the perimeter.

10. The voice coil motor actuator of claim 9, wherein the one or more magnets comprise at least one magnet that has two magnetization directions.

11. The voice coil motor actuator of claim 9, wherein the coils are configured to be coupled to a lens carrier of the dynamic portion of the camera module, wherein the coils are capable of electromagnetically interacting with the magnet to produce Lorentz forces on the lens carrier.

12. The voice coil motor actuator of claim 11, wherein the voice coil motor actuator is configured to utilize the Lorentz forces on the lens carrier to perform one or more auto focus adjustments for the camera module.

13. A multi-function electronic device, comprising:
one or more processors;
memory storing program instructions executable by the one or more processors to control operations of a camera; and
a camera module, comprising:
one or more lenses;
an auto-focus voice coil motor actuator, comprising a plurality of magnets and one or more drive coils, configured to move the one or more lenses relative to a static portion of the camera module;
wherein a perimeter of the camera module is non-rectangular and includes a recessed portion resulting in the camera module exhibiting an asymmetry in respect to at least one axis, wherein a distance from a center of the one or more lenses to the recessed portion of the perimeter is smaller than a distance from the center of the one or more lenses to other portions of the perimeter; and
wherein placement of the plurality of magnets and the one or more coils within the camera module is constrained due to the recessed portion of the perimeter such that placement of the plurality of magnets and the one more coils is asymmetric in respect to at least one axis.

14. The multi-function electronic device of claim 13, wherein the plurality of magnets are coupled to the static portion and one or more drive coils are coupled to a dynamic portion of the camera module comprising the one or more lenses, wherein at least one drive coil is located proximate one of the magnets and is capable of electromagnetically interacting with the magnet to produce Lorentz forces on the dynamic portion.

15. The multi-function electronic device of claim 14, wherein placement of the plurality of magnets within the camera module is constrained at least in part on an amount of space available between the dynamic portion and the recessed portion of the perimeter.

16. The multi-function electronic device of claim 13, further comprising an image sensor to capture image data based on light transmitted through the one or more lenses of the camera module.

17. The multi-function electronic device of claim 13, wherein the camera module further comprises:
one or more damping mechanisms configured to reduce or dampen movement of the one or more lenses;
wherein placement of the one or more damping mechanisms is constrained due to the recessed portion and the placement of the one or more coils such that placement of the damping mechanisms is asymmetric in respect to at least one axis.

18. The multi-function electronic device of claim 17, wherein the damping mechanisms comprise one or more damping pins coupled to the static portion and one or more gel pockets coupled to the one or more lenses, and wherein placement of the one or more gel pockets is constrained by placement of the one or more coils resulting in said asymmetric placement of the damping mechanisms.

19. The multi-function electronic device of claim 13, further comprising:
one or more springs configured to suspend the one or more lenses from a stationary base structure and to guide motion enabled by the actuator;
wherein the one or more springs are placed in an arrangement constrained at least by: an amount of space available between the one or more lenses and the recessed portion of the perimeter, placement of the plurality of magnets and the one or more coils and placement of damping mechanisms within the camera module; and
wherein individual ones of the one or more springs have differing characteristics due to the asymmetric placement of the plurality of magnets and one or more coils resulting in the produced Lorentz forces not being symmetrically aligned with a center of mass of the one or more lenses.

20. The multi-function electronic device of claim 13, further comprising:
a second camera module, comprising:
one or more lenses;
a second auto-focus voice coil motor actuator, comprising one or more magnets and one or more drive coils, configured to move the one or more lenses relative to a static portion of the camera module;
wherein a perimeter of the second camera module includes a recessed portion resulting in the second camera module exhibiting an asymmetry in respect to at least one axis, wherein a distance from a center of the one or more lenses to the recessed portion of the perimeter is smaller than a distance from the center of the one or more lenses to other portions of the perimeter;
wherein placement of the second actuator within the second camera module is constrained due to the recessed portion of the second camera module perimeter such that placement of the actuator is asymmetric in respect to at least one axis; and
wherein the camera module and the second camera module are located within the multi-function electronic device with the recessed portion of the camera module proximate to and aligned with the recessed portion of the second camera module, such that a distance between a center of one of the lenses of the camera module and a center of one of the lenses of the second camera module is smaller than if the two camera modules were placed without having the respective recessed portions aligned.

* * * * *